United States Patent
Ekselius et al.

(10) Patent No.: US 9,317,845 B1
(45) Date of Patent: Apr. 19, 2016

(54) FLEXIBLE ELECTRONIC PAYMENT TRANSACTION PROCESS

(71) Applicant: MasterCard International Incorporated, Purchase, NY (US)

(72) Inventors: Lukas Ekselius, Overijse (BE); Sebastien Pochic, Brussels (BE); Fikret Ates, Namur (BE); Barry Maidment, Cumbria (GB)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 14/580,295

(22) Filed: Dec. 23, 2014

(51) Int. Cl.
  *G06K 5/00* (2006.01)
  *G06Q 20/20* (2012.01)
(52) U.S. Cl.
  CPC ................................. *G06Q 20/204* (2013.01)
(58) Field of Classification Search
  USPC .................... 235/380, 487, 492, 451, 375
  See application file for complete search history.

(56) References Cited

U.S. PATENT DOCUMENTS

| | | | | |
|---|---|---|---|---|
| 2003/0236748 A1* | 12/2003 | Gressel et al. | ................. | 705/41 |
| 2006/0064391 A1* | 3/2006 | Petrov et al. | ................... | 705/65 |
| 2008/0103972 A1* | 5/2008 | Lanc | .............................. | 705/44 |
| 2010/0036741 A1* | 2/2010 | Cleven | ........................... | 705/17 |
| 2010/0252624 A1* | 10/2010 | Van de Velde et al. | ........ | 235/382 |
| 2013/0006847 A1* | 1/2013 | Hammad | .............. | G06Q 20/20 705/39 |
| 2014/0040146 A1* | 2/2014 | Fiske | ............................ | 705/67 |
| 2014/0101036 A1* | 4/2014 | Phillips | ............... | G06Q 20/027 705/39 |

\* cited by examiner

*Primary Examiner* — Edwyn Labaze
(74) *Attorney, Agent, or Firm* — Buckley, Maschoff & Talwalkar, LLC

(57) ABSTRACT

A point of sale (POS) terminal is programmed to execute EMV transactions by interaction with payment devices in accordance with a standard EMV transaction flow. An EMV transaction is commenced at the POS terminal with a particular payment device. The POS terminal receives a request from the payment device to interrupt the EMV transaction. The POS terminal responds to the request by interrupting the EMV transaction and taking an action indicated by the request. The action is not required for execution of the standard EMV transaction flow.

5 Claims, 12 Drawing Sheets

FLEXIBLE ELECTRONIC PAYMENT TRANSACTION PROCESS

BACKGROUND

Payment cards such as credit cards and debit cards are in widespread use. There is a widely known and used standard called "EMV" for interoperation of IC (integrated circuit) payment cards with suitably equipped POS (point of sale) terminals. The EMV standard is defined and managed by EMVCo LLC. EMVCo LLC is jointly overseen by major payment account brands, including MasterCard International Incorporated, which is the assignee hereof.

The present inventors have now recognized an opportunity to provide flexibility and enhanced functionality in connection with transaction processes performed by EMV-compliant POS terminals.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present invention, a payment network transaction is consummated at a POS terminal. The transaction may generally follow a standard EMV process flow, except that the POS terminal and/or the IC payment card may be programmed to insert additional process steps—such as prompts to the cardholder and/or interactions between the POS terminal and other devices—that are not required or called-for as part of the standard EMV process flow. These additional process steps may facilitate, for example, additional security measures, expense control procedures, and/or various value-added or marketing services, as detailed in example use-cases described below.

Figure 1:
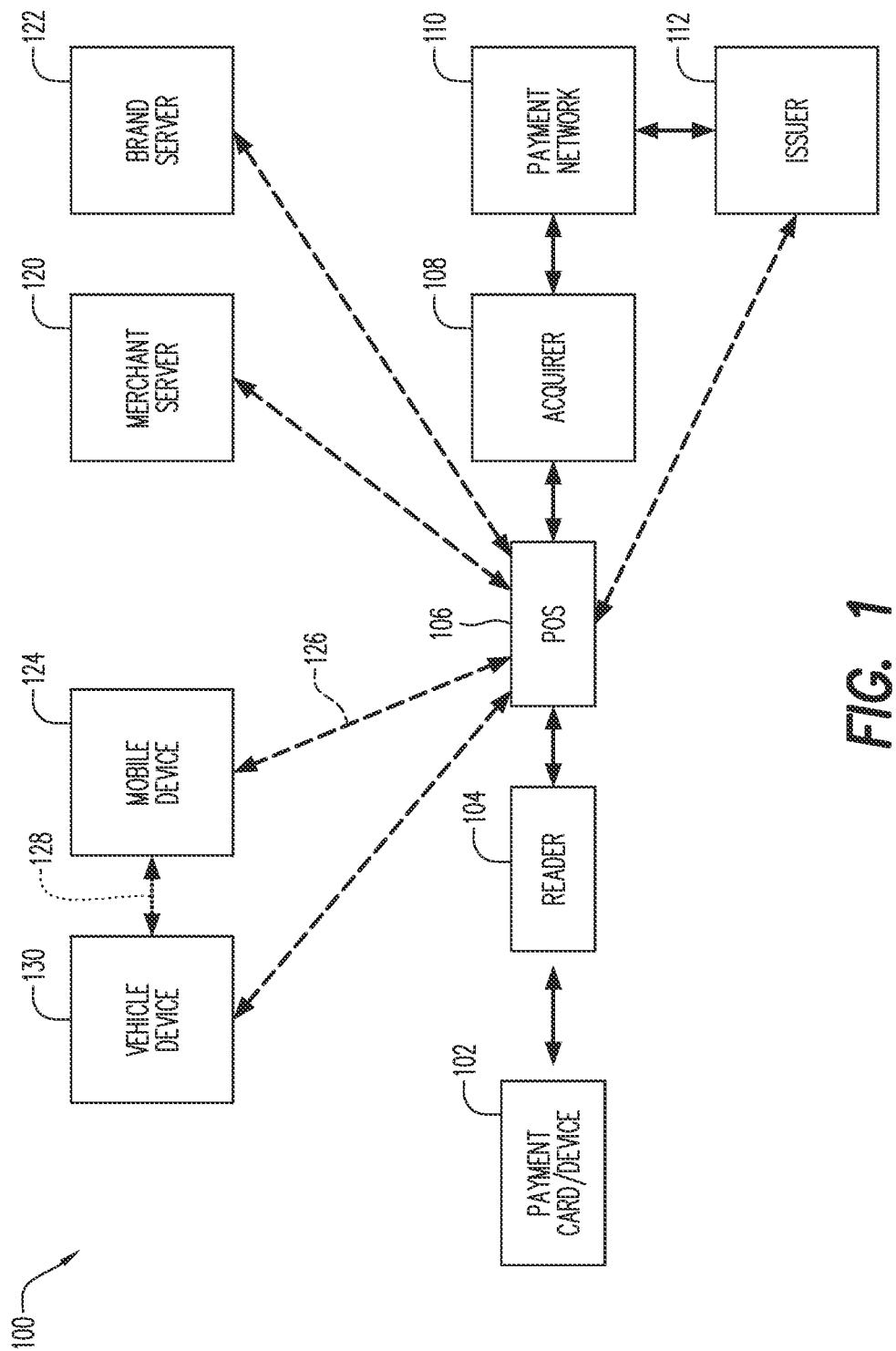
FIG. 1 is a block diagram that illustrates a payment system provided in accordance with aspects of the present invention.

FIG. 1 is a block diagram that illustrates a payment system 100 provided in accordance with aspects of the present invention.

The payment system 100 may include a payment card/device 102. The payment card/device 102 may, for example, be an IC card programmed with one or more applications to implement EMV transaction processing. Alternatively, the payment card/device 102 may be a mobile device such as a smartphone that has been programmed with one or more applications to implement EMV transaction processing. In the latter case, as will be appreciated by those who are skilled in the art, the payment card/device 102 may include short range communications capabilities (e.g., in accordance with the NFC standard) to enable the payment card/device 102 to engage in an exchange of data communications with a suitable terminal. In some embodiments, the payment card/device 102 may be a card that includes electrically conductive contacts by which data communications may occur via direct interfacing between the card and a reader device.

The payment system 100 may also include a reader component 104 associated with a POS terminal 106. In some embodiments, the reader component 104 is capable of engaging in contactless and/or contact data communications with the payment card/device 102 for the purpose of reading the payment card account number (or a proxy therefor, such as a payment token) and other information from the payment card/device 102. In some embodiments, as indicated above, the reader component 104/POS terminal 106 may be programmed to handle transaction processing in accordance with the EMV standard. Further details of the reader component 104/POS terminal 106 will be described below in connection with FIGS. 4 and 5, for example.

The reader component 104 and the POS terminal 106 may be located at the premises of a retail store and operated by a sales associate of the retailer for the purpose of processing retail transactions. The payment card/device 102 is shown in FIG. 1 to be interacting with the proximity reader component 104 and the POS terminal 106 for the purpose of executing such a transaction.

A computer 108 operated by an acquirer (acquiring financial institution) is also shown as part of the payment system 100 in FIG. 1. The acquirer computer 108 may operate in a conventional manner to receive an authorization request for the transaction from the POS terminal 106. The acquirer computer 108 may route the authorization request via a payment network 110 to the server computer 112 operated by the issuer of a payment card account that is associated with the payment card/device 102. As is also well known, the authorization response generated by the payment card issuer server computer 112 may be routed back to the POS terminal 106 via the payment network 110 and the acquirer computer 108.

One well known example of a payment network is referred to as the "Banknet" system, and is operated by MasterCard International Incorporated, which is the assignee hereof.

The payment card issuer server computer 112 may be operated by or on behalf of a financial institution ("FI") that issues payment card accounts to individual users. For example, the payment card issuer server computer 112 may perform such functions as (a) receiving and responding to requests for authorization of payment card account transactions to be charged to payment card accounts issued by the FI; and (b) tracking and storing transactions and maintaining account records.

In accordance with aspects of the present invention, the POS terminal 106 may engage in interactions in addition to interacting with the payment card/device 102 and transmitting an authorization request and receiving an authorization response via the acquirer computer 108. For example, in some embodiments, the POS terminal 106 may interact directly with the issuer server computer 112. (In some embodiments, the issuer computer with which the POS terminal directly interacts may be separate from the server that handles transaction authorization requests, though still operated by or on behalf of the payment account issuer.)

In addition or alternatively, the POS terminal may interact with a merchant server 120 that is operated by the merchant that also operates the POS terminal 106. In some embodiments, the interaction between the POS terminal 106 and the merchant server 120 may occur after the EMV transaction has begun and before it has completed; the interaction between the POS terminal 106 and the merchant server 120 may be different from the known type of item identification/price look-up that may commonly occur upon scanning an item barcode.

Furthermore, in some embodiments, the POS terminal 106 may interact with a brand server 122 that is operated by the manufacturer or distributor of one of the items that is being purchased in the current transaction.

In addition, or alternatively, the POS terminal may interact with a mobile device 124 that is carried by the user of the payment card/device 102. Even if the mobile device 124 is one and the same with the payment card/device 102, the interaction indicated at 126 in FIG. 1 may be "out of band" relative to the EMV interaction between the payment card/device 102 and the reader 104/POS terminal 106. In some embodiments, the interaction 126 between the mobile device 124 and the POS terminal 106 may lead to a further interaction (reference numeral 128) between the mobile device 124 and a vehicle device 130. The vehicle device 130 may be installed in a motor vehicle (not shown) associated with the user of the payment card/device 102 and may serve to gather, store and/or report data relating to the use or condition and/or identification of the motor vehicle.

In other embodiments, the POS terminal 106 may interact directly with the vehicle device 130.

The components of the payment system 100 as depicted in FIG. 1 are only those that are needed for processing a single transaction. A typical payment system may process many purchase transactions (including simultaneous transactions) and may include a considerable number of payment card issuers and their computers, a considerable number of acquirers and their computers, and numerous merchants and their POS terminals and associated reader components. The system may also include a very large number of payment card account holders, who carry payment cards or other devices for initiating payment transactions by presenting an associated payment card account number or payment token to the reader component of a POS terminal. In addition the payment system 100 may include a considerable number of different components in each of the categories of devices represented by blocks 120, 122, 124 and 130.

Figure 2:
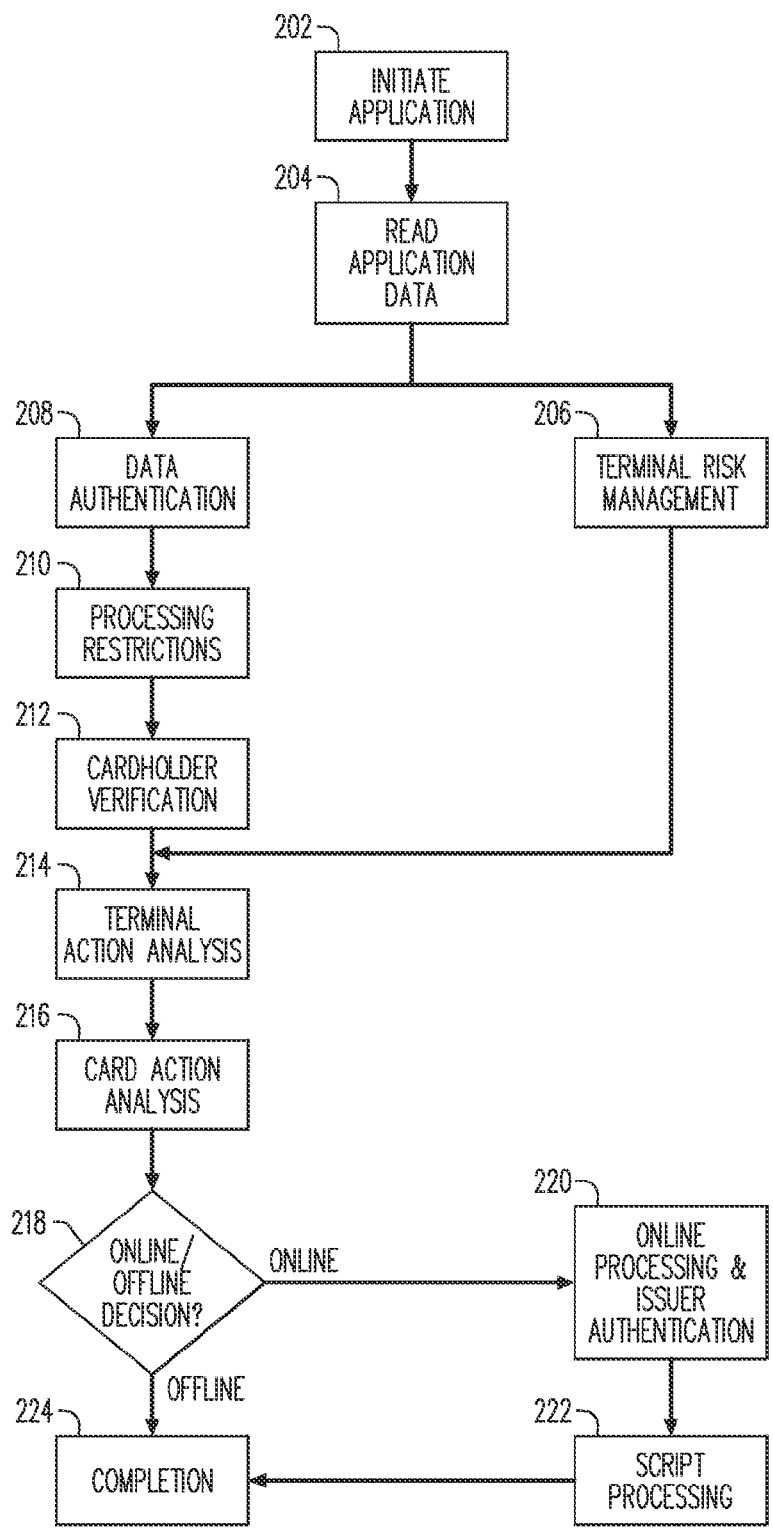
FIG. 2 is a flow diagram that illustrates a conventional EMV transaction process.

FIG. 2 is a flow diagram that illustrates a conventional EMV transaction process.

At 202 in FIG. 2, the reader component 104/POS terminal 106 sends a data communication to the payment card/device 102 to initiate processing by an EMV application running on the payment card/device 102. This entails the reader component 104/POS terminal 106 sending a suitable command to the payment card/device 102 which results in the payment card/device 102 responding with an application interchange profile (AIP) that indicates what functions are to be performed in connection with processing the transaction.

At 204, a command from the reader component 104/POS terminal 106 causes data files stored in the payment card/device 102 to be read.

In the transaction flow example illustrated in FIG. 2, terminal risk management processing (block 206) may be performed in parallel with other functions. Those other functions may include data authentication (block 208). The data authentication process step may include a cryptographic validation of the payment card/device 102 via public-key cryptography.

Block 210 in FIG. 2 represents checking on whether there are processing restrictions that prevent the payment card/device 102 from being used for the current transaction. These checks may confirm the appropriateness of the application version number, the application usage control data and the effective and expiration dates of the application relative to the card/device application that is being proposed for use in the transaction.

At block 212, the reader component 104/POS terminal 106 performs a cardholder verification method (CVM) according to (a) a CVM list provided by the payment card/device 102, considered with (b) the CVM capabilities supported by the reader component 104/POS terminal 106.

Block 214 represents a "terminal action analysis", i.e., a determination by the reader component 104/POS terminal 106 as to whether the transaction should be approved or declined offline, or sent via the payment network for online authorization.

Block 216 represents a "card action analysis", i.e., a determination on the part of the payment card/device 102 as to whether it should accept the terminal's action analysis or alternatively decline the transaction or force the transaction to be processed online.

Decision block 218 represents an outcome of the analyses at blocks 214 and 216 leading to a determination as to whether the transaction is to be handled on an offline or online basis. If the resulting determination leads to a decision to process online, then the processing at block 220 takes place. At block 220, the online process including authorization request and authorization response (from the issuer) takes place. At 222, the payment card/device 102 may process a script provided from the issuer.

Completion of the transaction (block 224) may either follow blocks 220 and 222, or may directly follow decision block 218, depending on what determination was made at decision block 218 regarding offline vs. online processing for the transaction.

Figure 3:
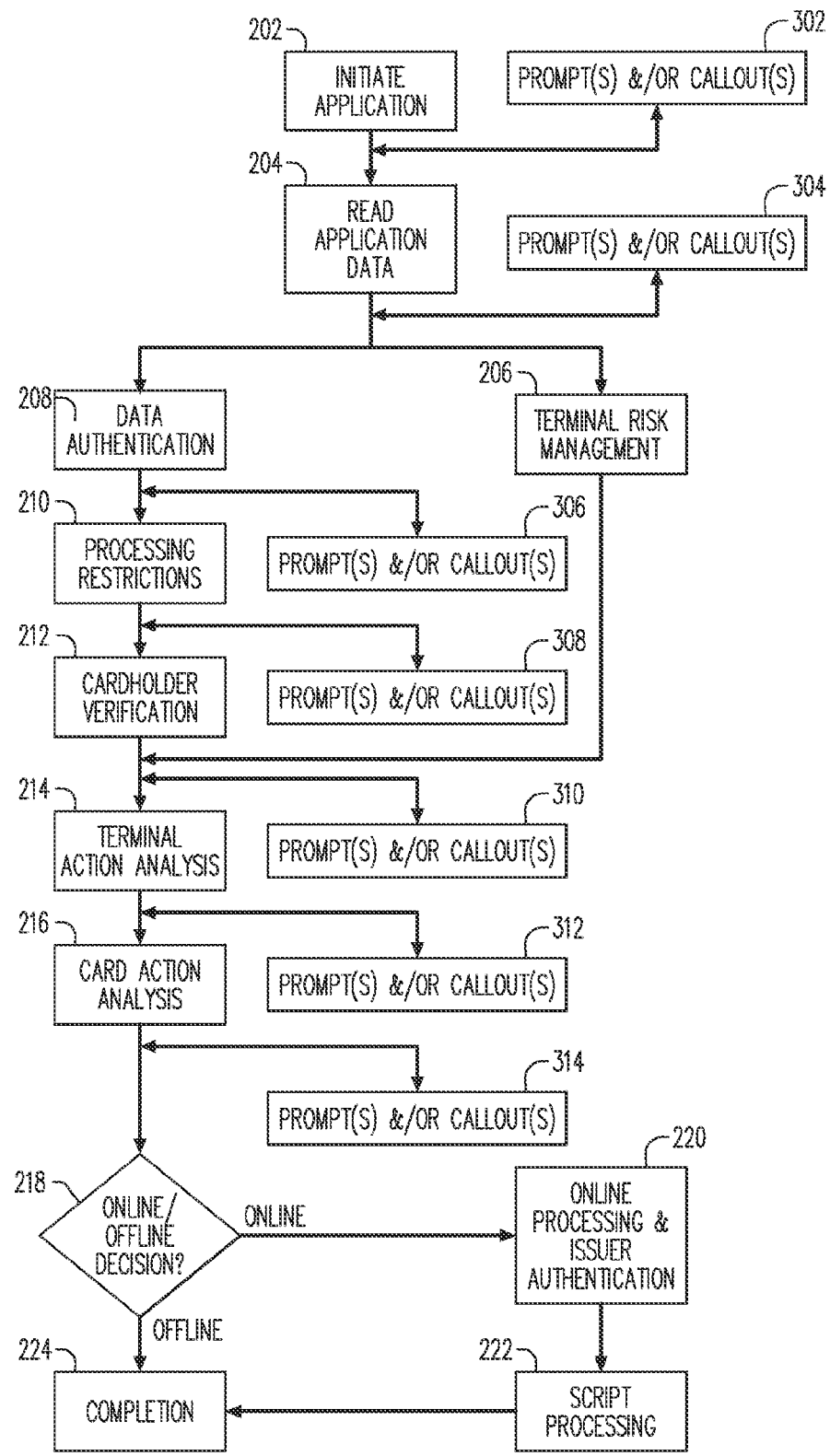
FIG. 3 is a flow diagram that illustrates a more flexible EMV transaction process performed in accordance with aspects of the present invention.

FIG. 3 is a flow diagram that illustrates a more flexible EMV transaction process performed in accordance with aspects of the present invention.

All of the functional flow blocks shown in FIG. 2 and discussed above are also present in FIG. 3. In addition, FIG. 3 illustrates examples of points in the normal EMV process flow where, in accordance with aspects of the present invention, the process flow may be interrupted with prompts from the POS terminal 106 to the cardholder and/or with what will now be referred to as "callouts". The term "callout" should be understood to refer to an interaction between the POS terminal 106 and another device, where the other device is not the payment card/device 102 and the interaction is something different from transmitting an authorization request or receiving an authorization response. In general, a callout is not an action required for execution of a standard EMV transaction. The other device with which the POS terminal interacts during a callout may sometimes be referred to as an "endpoint". Example endpoints illustrated in FIG. 1 include blocks 120, 122, 124 and 130. An additional example of a callout occurs when the reader component 104/POS terminal 106 is the same device as the mobile device 124, and the interaction between the POS terminal 106 and the mobile device 124 is out of band relative to the EMV transaction process. For example, the interaction between the POS terminal 106 and the mobile device 124 may engage an application on the mobile device that is different from the mobile device EMV application that is conducting the EMV transaction.

Referring now to FIG. 3, block 302 represents a point between blocks 202 and 204 at which one or more prompts or callouts may occur. Block 304 represents a point after block 204 at which one or more prompts or callouts may occur. Block 306 represents a point between blocks 208 and 210 at which one or more prompts or callouts may occur. Block 308 represents a point between blocks 210 and 212 at which one or more prompts or callouts may occur. Block 310 represents a point between blocks 212 and 214 at which one or more prompts or callouts may occur. Block 312 represents a point between blocks 214 and 216 at which one or more prompts or callouts may occur. Block 314 represents a point between block 216 and decision block 218 at which one or more prompts or callouts may occur.

Figure 4:
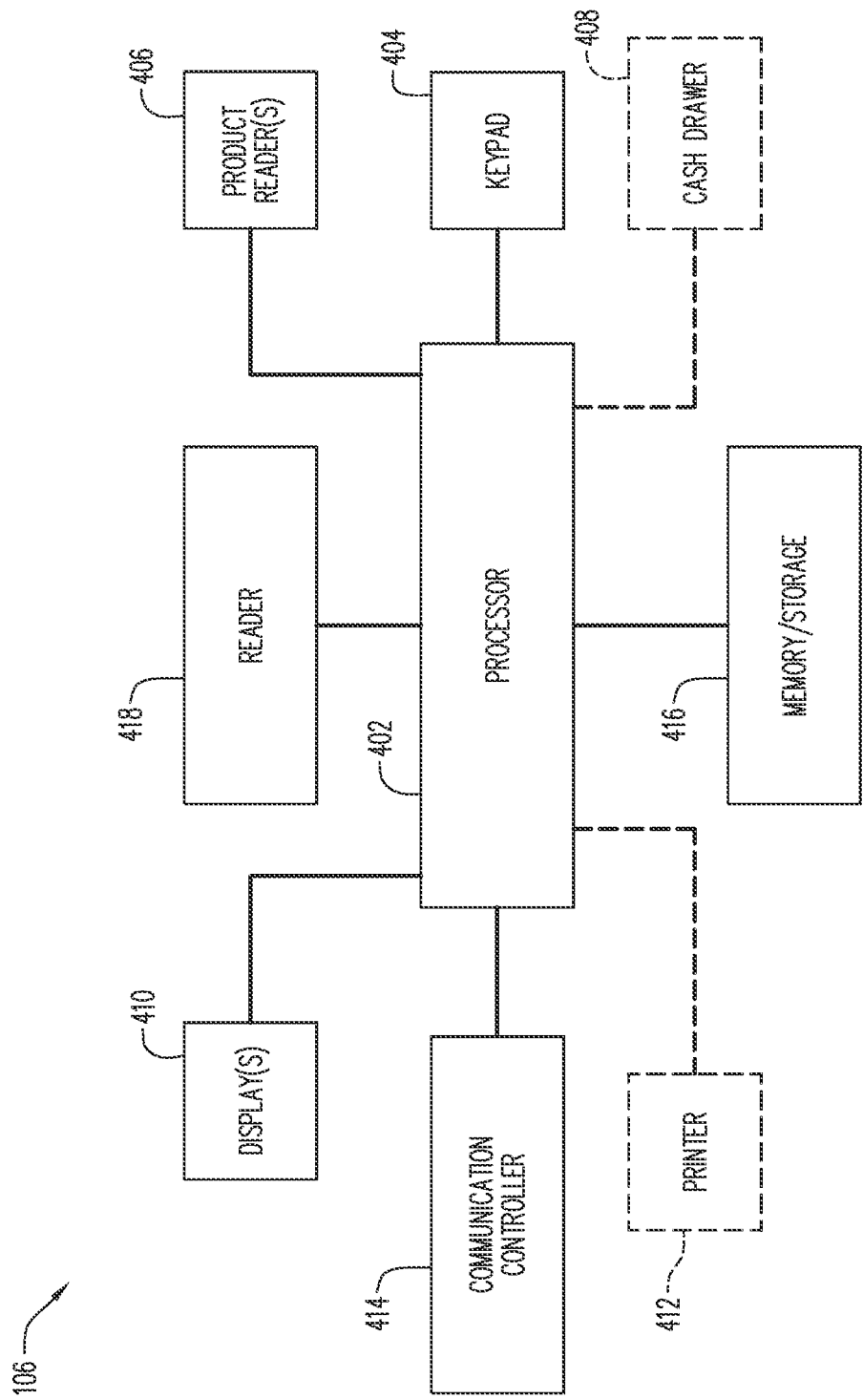
FIG. 4 is a block diagram that illustrates a point of sale (POS) terminal provided in accordance with aspects of the present invention and that may be part of the system of FIG. 1.

FIG. 4 is a block diagram that illustrates the merchant POS terminal 106 shown in FIG. 1 and provided in accordance with aspects of the present invention.

In some embodiments, the POS terminal 106 may be largely or entirely conventional in its hardware aspects. Nevertheless, the POS terminal 106 may be programmed in accordance with aspects of the present disclosure (including being controlled in accordance with prompt and/or callout instructions communicated to the POS terminal 106 from the payment card/device 102) to provide functionality as described herein. In addition to descriptions herein of functional process steps performed by the POS terminal 106, there will also be discussion of some software aspects of the POS terminal 106 in connection with FIG. 5. For now, however, a brief description of hardware aspects of the POS terminal 106 will follow, with continued reference to FIG. 4.

The POS terminal 106 may include a processing element (or elements) such as the processor 402 shown in FIG. 4. The processor 402 may, for example, be a conventional microprocessor, and may operate to control the overall functioning of the POS terminal 106.

The POS terminal 106 may also include conventional peripheral components, in communication with and/or controlled by the processor 402, such as: (a) a keypad 404 for receiving input from the human operator of the POS terminal; (b) a product reader 406 for reading any form of unique product identifier, such as a barcode or RFID, that appears on, or is attached to, products brought to the terminal for purchase; (c) a cash drawer 408 for storing cash received from customers; (d) one or more displays 410 for providing output (e.g., identifying products presented for purchase and their prices, indicating sales tax due, indicating transaction subtotals and totals, etc., providing prompts to the customer and/or to the sales associate); (e) a printer 412 for printing out sales receipts; and (f) a communication controller 414 for allowing the processor 402, and hence, the POS terminal 106, to engage in communication over data networks with other devices (e.g., with endpoints involved in callout interactions with the POS terminal 106). (In some embodiments, at least one of the displays 410 may be a touch screen, so as to provide an input function as well as an output function.)

In addition, the POS terminal 106 may include one or more memory and/or data storage devices (indicated collectively at 416), which may comprise any combination of one or more of a hard disk drive, RAM (random access memory), ROM (read only memory), flash memory, etc. The memory/data storage device(s) 416 may store software and/or firmware that programs the processor 402 and the POS terminal 106 to perform functionality as described herein. Thus the memory/data storage device(s) 416 may be in communication with the processor 402. Further, the POS terminal 106 may include one or more housings (not shown) which contain and/or support one or more of the other components shown in FIG. 4.

Referring again to FIG. 4, the POS terminal 106 also includes or has associated with it the above-referenced reader component 104 by which the POS terminal 106 exchanges communications with the payment card/device 102. Thus the reader component 104 may be a contact and/or contactless IC card reader and/or may include NFC communication capability for exchanging data communications with payment-enabled mobile devices (of which the latter may be example embodiments of the payment card/device 102).

Figure 5:
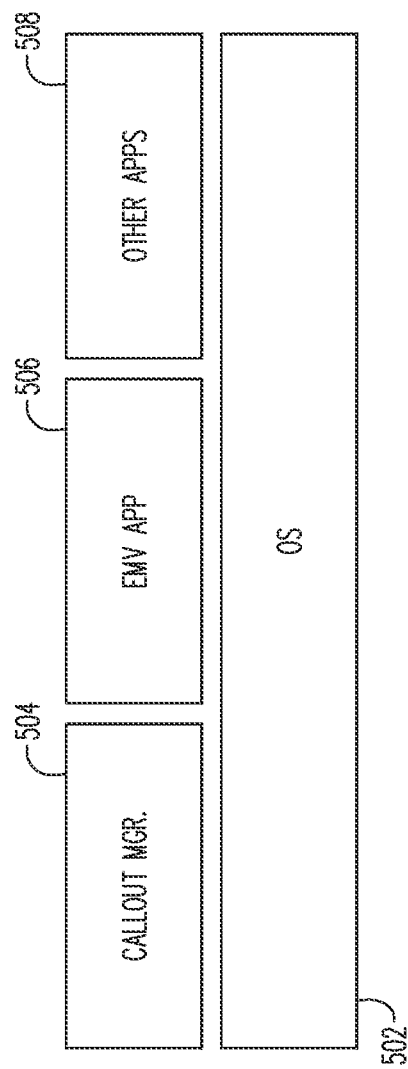
FIG. 5 is a diagram that illustrates some software aspects of the POS terminal of FIG. 4.

FIG. 5 schematically illustrates software aspects of the POS terminal 106 (FIGS. 1 and 4). The software features shown in FIG. 5 may be stored in the memory/storage device(s) 416 (FIG. 4) and may serve to program/control the processor 402 of the POS terminal 106.

Block 502 in FIG. 5 represents an operating system that controls basic operations of the POS terminal 106 and that serves as a host for application programs and drivers that may also be stored in the memory/storage device(s) 416. Block 504 in FIG. 5 represents a callout manager program that may be provided in accordance with aspects of the present invention to provide functionality with respect to callouts and user prompts as described herein. Block 506 represents an EMV application, which may control the POS terminal 106 to perform payment account transactions in accordance with the EMV standard.

Unlike the EMV application 506, the operation of the callout manager program may be such that it does not need to be certified in accordance with practices for programming of EMV terminals.

Block 508 represents other application programs that may control other aspects of operation of the POS terminal 106.

The callout manager program 504 may allow the POS terminal 106 to operate so as to accommodate insertion of callouts within the standardized EMV transaction process flow. A similar approach may be taken with respect to standard transaction processes other than EMV. As noted above, the callouts may result in the POS terminal interacting with specified endpoints. The callouts may engage custom (e.g., issuer specified) processes and procedures to be completed during and before completion of the standard transaction process. The callout manager program 504 also may operate to bring about interruptions in the standard transaction process for the purpose of prompting the cardholder to enter issuer-specified data that goes beyond data called for by the standard transaction process. The callout manager program 504 may control the POS terminal 106 such that the POS terminal 106 takes its cue(s) as to prompts and/or callouts from data transmitted from the payment card/device 102 to the POS terminal 106. Because the issuer of the payment account to be accessed via the payment card/device 102 controls that data stored in association with the relevant payment application in the payment card/device 102, this approach allows for the above-mentioned issuer-specific insertion of prompts/processes into the standard transaction flow.

Callouts may support some or all of the following functions, in addition to other functions not explicitly listed below: (a) confirming that the POS terminal 106 is capable of performing callouts; (b) verification of which telecommunications options are provided for use by callouts by the POS terminal 106; (c) selection of an appropriate telecommunications technology to be used to contact a specific endpoint; (d) provision of a package of commands and/or data to be sent to the endpoint; (e) provision of the relevant endpoint's address for the selected communications technology (e.g., URL for internet, mobile phone number, LANWAN address, etc.); (f)

receiving data and/or commands from the endpoint; and/or (g) relaying data and/or commands from the endpoint to the payment card/device 102.

A given callout may be mandatory or conditional. Conditional callouts may or may not require the POS terminal 106 to contact an endpoint, depending on the result of a preceding standard transaction process step or a preceding callout or on confirmation being provided by the payment card/device 102 at the appropriate point in the transaction process.

A callout may require one or more endpoints to be contacted by the POS terminal 106. If a callout relates to multiple endpoints, the callout may specify the order in which the endpoints are to be contacted and whether contact is mandatory or conditional upon the results of a previous contact in the list of contacts specified by the callout.

The payment card/device 102 may be personalized by the issuer with (a) a list of prompts for additional data to be used by the POS terminal 106, where the additional data may be input manually by the cardholder or another individual, generated by the POS terminal 106, or collected by the POS terminal 106; and (b) a list of callouts to be made by the terminal to endpoints specified by the payment card/device 102. Both the prompt list and the callout list may identify the points (e.g., blocks 302, 304, 306, 308, 310, 312 and/or 314—FIG. 3) in the standard process flow at which each required prompt or callout is to be performed. A callout list may include for each endpoint the telecommunications technology or technologies that can be used by the POS terminal 106 to contact that endpoint and the endpoint address appropriate to the technology identified. A given prompt may include an embedded callout list. In some embodiments, the payment card/device 102 may deliver/transmit the prompt and/or callout lists to the POS terminal 106 as soon as possible after the start of the standard transaction process flow, once the payment card/device 102 and the POS terminal 106 have established that they both support the relevant transaction processing standard and application and callout standard. On the POS terminal 106 side, the callout manager program 504 may handle confirmation of support of the callout standard, receiving and parsing of prompt and/or callout lists, and insertion of prompts and/or callouts into the standard transaction process flow.

To enable the POS terminal 106 to support prompts/callouts in accordance with aspects of the present invention, the POS terminal 106 may be required to support an applicable callout standard governing interaction between payment devices/cards and terminals in regard to callouts. The POS terminal 106 may also be required to include one or more telecommunications (and/or local communications) technologies to be used in performing callouts and contacting endpoints. The POS terminal may also need to be capable of initiating contact and engaging in two-way communication with the endpoint, using the selected telecommunication technology and endpoint address, as indicated by the payment card/device 102.

It may be the case that the POS terminal 106 need not understand the process flow that occurs according to the callout code and its interaction with the endpoint. It may also be the case that the POS terminal 106 need not understand the data and/or commands exchanged between the callout and the endpoint.

Examples of endpoints were described above in connection with FIG. 1. More generally, examples of possible endpoints are listed below, and the list is not exclusive: (a) systems/servers operated by or on behalf of the payment account issuer represented in the payment card/device 102; (b) a system operated by a third party (i.e., a party other than the issuer or acquirer/merchant); (c) an application on a mobile device, such as a mobile phone, smartphone, tablet computer, laptop computer, etc.—any of which may be owned by the payment account holder; and/or (d) a device application, system or server operated by the merchant or acquirer.

FIGS. 6-12 are flow diagrams that illustrate transaction processes and/or use cases that may be performed in accordance with aspects of the present invention.

Figure 6:
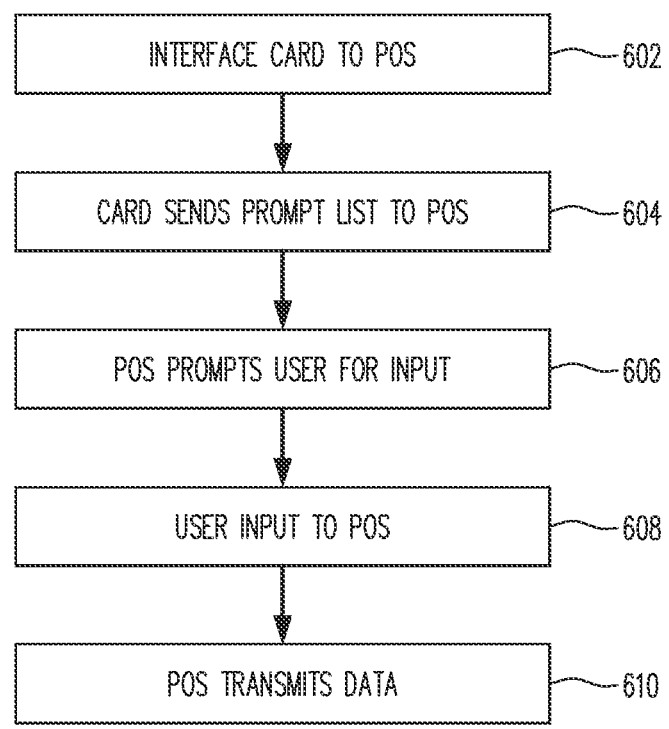
FIGS. 6-12 are flow diagrams that illustrate transaction processes and/or use cases that may be performed in accordance with aspects of the present invention

FIG. 6, in particular, illustrates a process flow that may be performed in connection with a use-case in which an organization operates a motor vehicle fleet and issues payment cards/accounts to drivers of the vehicles (not shown) to facilitate payment for fuel and/or other purchases required in connection with the vehicles. It is further assumed for this use-case that the fleet operator wishes to have data gathered in connection with transactions with the "fleet cards" to aid in controlling expenses and assuring proper usage of the cards. In this example, the data may be gathered via a prompt or prompts to the cardholder (or sales associate) or via automatic collection of the data by the POS terminal 106. The data may include vehicle mileage, vehicle registration number or other vehicle identifier, etc. In this example, callouts do not occur; rather only prompts are inserted into the usual transaction process flow.

Referring then to FIG. 6, at block 602, the payment card/device 102 is interfaced to the POS terminal 106. It may be the case, for example, that the payment card/device 102 is embodied as a contact IC payment card that remains interfaced to the terminal throughout the process flow.

At 604, the payment card/device 102 sends a prompt list to the POS terminal 106. In some embodiments, for example, the payment card/device 102 may send the prompt list as a part of process block 204 ("read application data") as shown in FIG. 3. For example, the prompt list may require the POS terminal 106 to display a prompt for manual entry of the vehicle's registration number. The prompt list may further require a prompt for manual entry of the vehicle odometer reading after cardholder verification (block 212, FIG. 3).

Continuing to refer to FIG. 6, at block 606 the POS terminal 106 performs the prompts as specified in the prompt list. At 608, the user/cardholder manually enters the requested data in response to the prompts. At 610, the data entered at 608 is included by the POS terminal 106 in online authorization messaging that is routed to the fleet card issuer (e.g., to the issuer server 112, FIG. 1). In some embodiments, the issuer may determine its authorization response based at least in part on the appropriateness of the data entered at 608 and transmitted by the POS terminal 106 at 610. In addition or alternatively, the issuer may report the vehicle use/identification information to the fleet operator as part of routine reporting on the fleet accounts.

Figure 7:
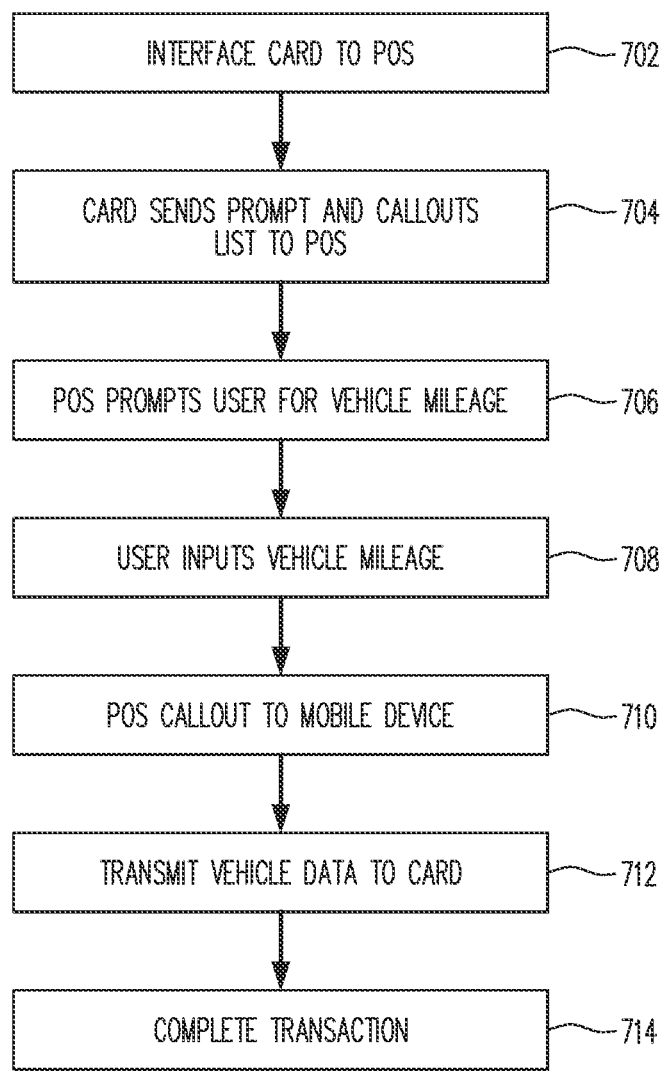

The fleet card use-case described above in connection with FIG. 6 can be extended to include callouts. Such a use-case is illustrated in FIG. 7, and includes a callout to a mobile device.

Referring now to FIG. 7, again at block 702 the payment card/device 102 is interfaced to the POS terminal 106. At 704, the payment card/device 102 sends a prompt and callout list to the POS terminal 106. This list may include a prompt for manual entry of the vehicle's current mileage. The prompt list may specify that the POS terminal 106 is to display the prompt after cardholder verification (block 212 in FIG. 3). Continuing to refer to FIG. 7, blocks 706 and 708 respectively represent the POS terminal 106 presenting the required prompt and the user/cardholder entering the requested data. The data input at 708 may be transmitted from the POS terminal 106 via the acquirer 108 (FIG. 1) and the payment network 110 to the issuer server 112 as part of an online authorization request. The issuer server 112 may use the data in authorization decision processing (e.g., by checking that the amount of fuel purchased is reasonable relative to the distance traveled since the last such transaction). In addition or alternatively, the data may be included in management information reports to the fleet operator.

Referring again to FIG. 7, block 710 represents the performance by the POS terminal 106 of a callout included in the list transmitted to it (and received by it) at 704. The endpoint for the callout may be the user/cardholder's mobile device (e.g., a smartphone, see block 124 in FIG. 1), which may have been associated with the payment card/device 102. In some embodiments, the mobile device that is the endpoint may physically be the same device as the payment card/device 102, but the callout may be directed to an application program on the mobile device that is different from the payment application (e.g., the EMV application) that interacts with the POS terminal 106 for the standard transaction steps. In other embodiments, e.g., when the payment card/device 102 is an IC payment card that accesses a specific payment account, the mobile device/endpoint may have been associated with the payment account in the records of the payment account issuer.

In some embodiments, the callout may be a geolocation operation to confirm that the cardholder's mobile device is located at the site of the EMV transaction, with the geolocation data for the mobile device serving as additional cardholder verification for the user of the payment card/device 102. In such a case this callout may also be performed after the standard cardholder verification step 212 shown in FIG. 3. The code that defines the callout may provide the mobile phone number for the cardholder's mobile device to the POS terminal 106. As alternative addressing information for the mobile device, the callout code may provide the POS terminal 106 with an encrypted wi-fi access code and encrypted application password for the mobile device. In the latter case, the mobile device may decrypt and verify the encrypted access code and password. The mobile device may then transmit data (e.g., in this use-case, geolocation data) to the POS terminal 106. The POS terminal 106 may (per block 712, FIG. 7), in turn, transmit the geolocation data, and/or vehicle information collected by the mobile device, to the payment card/device 102. The data received from the mobile device may be employed to complete the transaction (block 714) per offline or online authorization processing.

In some embodiments, if the geolocation data does not tend to confirm that all is in order with the transaction, this may result in execution of a conditional callout to, e.g., perform additional risk management activities such as triggering the issuer server to send a text to the mobile device to elicit a response from the user (e.g., a password or biometric verification process).

In a variation on the use-case of FIG. 7, and as suggested above, in some embodiments, the cardholder's mobile device 124 (FIG. 1) may be linked via communication channel 128 to an on-board vehicle device/system 130. The callout list provided by the payment card/device 102 to the POS terminal 106 may include a callout from the POS terminal 106 to the mobile device 124 and also to the vehicle device 130 via the mobile device 124. Once more the callout may be set to occur after cardholder verification (block 212, FIG. 3). The same sort of addressing/access information may be provided as discussed above to allow the POS terminal 106 to contact the mobile device/endpoint 214. The vehicle odometer reading or the like may be obtained by the mobile device 124 from the vehicle device 130, and provided to the POS terminal 106 and onward to the issuer for authorization decision processing and/or management information reporting, as described above in connection with FIG. 6. In addition or alternatively, the mobile device 124 may relay vehicle diagnostic data to the POS terminal 106, and again onward to the issuer. The cardholder and/or the fleet operator may thereby be informed of servicing and/or repair requirements relative to the vehicle.

Figure 8:
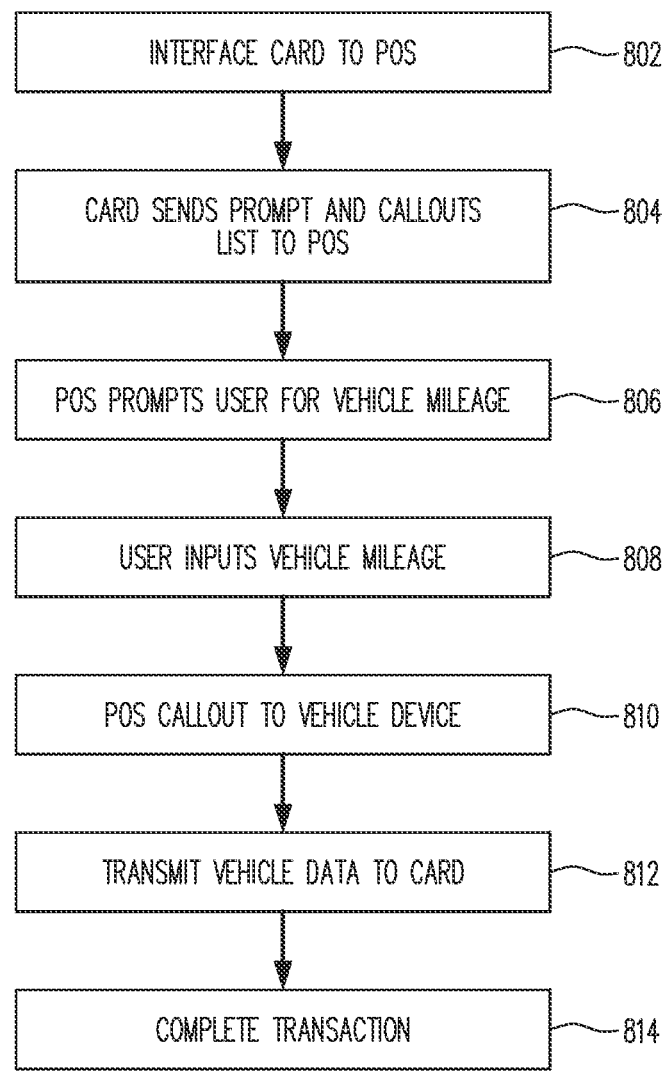

FIG. 8 illustrates another fleet card use-case, but with the variation that the callout endpoint is the on-board vehicle device 130 rather than the mobile device 124. For the purpose of this example use-case, it may be assumed that the vehicle device 130 has wi-fi communications capability.

At 802 in FIG. 8, the payment card/device 102 is interfaced to the POS terminal 106. At 804 (as in 704 of FIG. 7), the payment card/device 102 sends/transmits a prompt and callouts list to the POS terminal 106. At 806 (as in 706 of FIG. 7), the POS terminal 106 prompts the user to enter the vehicle odometer reading. At 808 (as in 708 of FIG. 7), the user inputs the vehicle odometer data into the POS terminal 106. At 810, the POS terminal 106 performs the callout, with the endpoint of the callout being the vehicle device 130 rather than the mobile device 124. Thus, in the use-case of FIG. 8, the POS terminal 106 may receive relevant vehicle data directly from the vehicle device 130 rather than via the mobile device 124. At 812, the POS terminal 106 may transmit the vehicle data to either or both of the payment card/device 102 and/or (via a payment system online authorization request) to the payment account issuer. At 814, the transaction may be completed via offline or online authorization decisioning.

Figure 9:
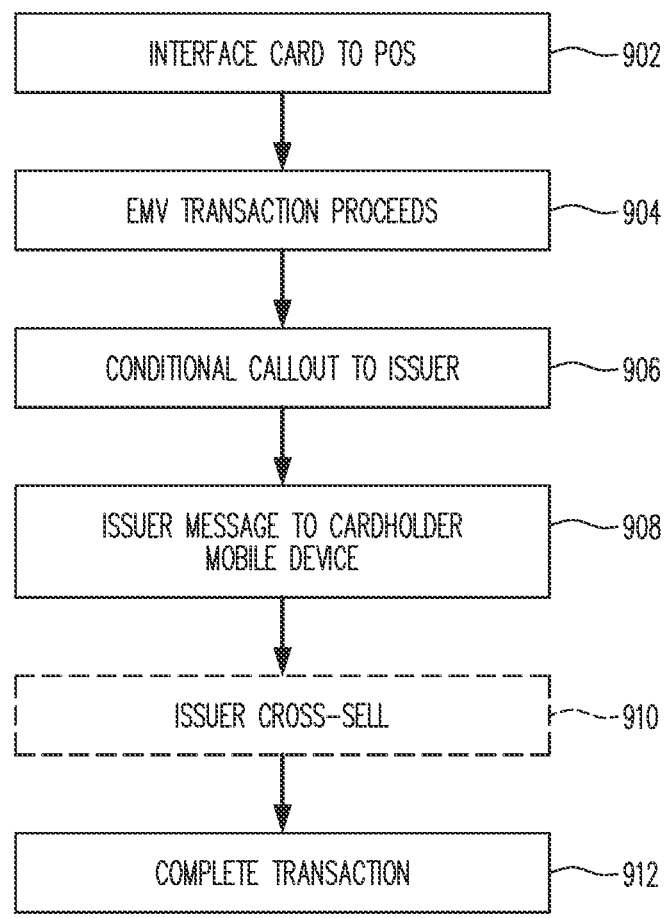

FIG. 9 illustrates a use-case in which a callout may be used to support marketing and/or cross-selling activities by the payment account issuer. For purposes of this example use-case, it will be assumed that the payment account is for personal use, rather than being a fleet account, as in use-cases described above. In particular, in this use-case, there may be a conditional callout that is performed depending on details of the purchase transaction.

At 902 in FIG. 9, the payment card/device 102 is interfaced to the POS terminal 106. At 904, the EMV standard process may commence and proceed and the payment card/device 102 may send/transmit a prompt and/or callout list to the POS terminal 106. As before, this may occur, for example, as part of block 204 in FIG. 3. For present purposes, it is assumed that the callout list includes a conditional callout with an issuer device/system as the endpoint. The endpoint may be the issuer server 112 (FIG. 1) or another system/computer operated by the issuer. If the endpoint is the issuer server 112, the communication channel from the POS terminal 106 may be separate from the acquirer/payment network communication channel.

In some embodiments, the condition for the conditional callout may be based on data received by the payment card/device 102 during the transaction, and may for example be based on items such as the merchant's Merchant Category Code and the purchase price. In some embodiments, the payment card/device 102 may determine that the transaction can be authorized offline. The payment card/device 102 may then confirm that the conditions for the conditional callout are satisfied, and that the callout to the issuer system should be initiated after block 216 ("card action analysis", FIG. 3). Execution of the callout by the POS terminal 106 is indicated by block 906 in FIG. 9. In some embodiments, for example, the callout may alert the issuer to an opportunity to offer insurance to the account holder for a high value item that is being purchased in the transaction.

As indicated by block 908, the issuer may respond to the callout by sending an appropriate offer in a message to the account holder's mobile phone. This may occur, for example, via SMS text message or via an email message to an email address for the account holder. As a result of the message, the account holder may initiate contact with the issuer's cross-selling system via, e.g., the internet, using a URL included in the message from the issuer to the mobile phone. Block 910 represents the cross-sell transaction that may occur, and block 912 represents completion of the EMV transaction at the point of sale.

In this use-case, the callout to the issuer may allow the issuer to contact the account holder for the cross-sell opportunity in a much more timely manner than if the cross-sell approach occurred only after the issuer received and analyzed the offline transaction data. The latter course of events is likely to be delayed for a considerable period of time.

Figure 10:
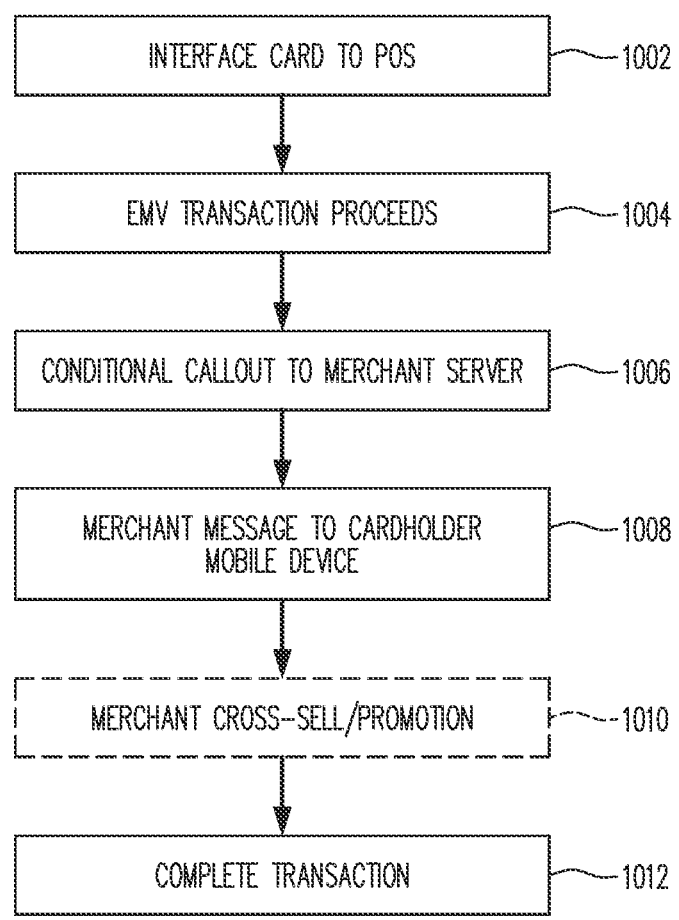

FIG. 10 illustrates a use-case in which a conditional callout may be made to a merchant's server/system. Suppose, for example, that the payment card/device 102 is an EMV payment card co-branded with the retailer at which the transaction is taking place. At 1002 in FIG. 10, the payment card/device 102 may be interfaced to the POS terminal 106. The EMV transaction may proceed (block 1004), including the payment card/device 102 sending a prompt/callout list to the POS terminal 106. The condition for the callout may be based on the specifics of the transaction, including, e.g., item(s) purchased, and may support an opportunity for the merchant to make a promotional offer to the cardholder. In addition or alternatively, a condition of the callout may be that the merchant i.d./acquirer i.d. match the co-branding sponsor of the payment account. The endpoint for the callout may be a server/computer system operated by the merchant and accessible by the POS terminal 106 via a LAN or WAN connection. The merchant server/system may host a loyalty merchandising program. The callout may be executable, if the condition is satisfied, after block 202 ("initiate application", FIG. 3).

Block 1006 in FIG. 10 represents performance of the callout by the POS terminal 106. At block 1008, the merchant system/server (e.g., which was the endpoint of the callout) may send a message to the cardholder's mobile device. This could be, for example, an SMS text message that conveys the promotional offer. In another embodiment, if the payment card/device 102 is a "display card" (that is, an IC card that includes a visual display output), the message from the merchant to the cardholder may be sent via the POS terminal 106 for display on the card display.

The merchant cross-sell/promotion opportunity is represented by block 1010 in FIG. 10, and the completion of the EMV transaction is indicated by block 1012.

Figure 11:
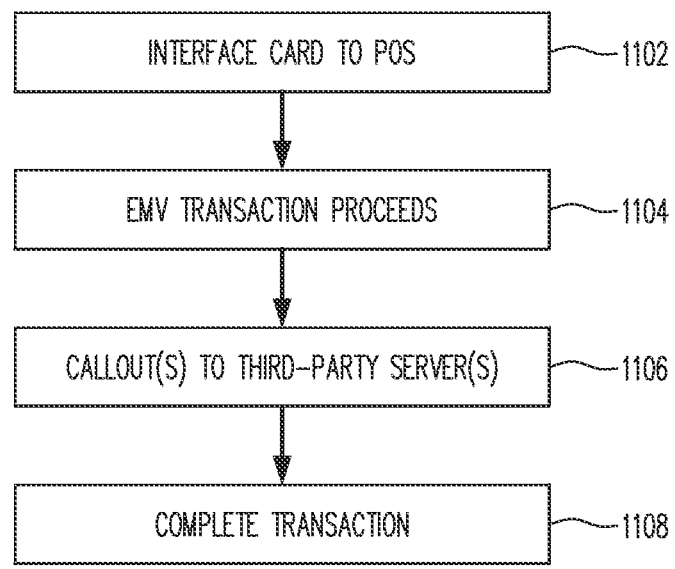

FIG. 11 illustrates yet another use-case. In the use-case of FIG. 11, one or more callouts may be made to a computer system that is operated by a "third party"; i.e., an entity that is not a party in any way to the current EMV transaction. In one example of such a use case, the payment account in question may be a corporate travel and entertainment card provided to a corporate employee/card user. It will further be assumed that the transaction in question involves the payment card/device 102 being presented to the POS terminal 106 by the user upon checking in to a hotel while on a business trip.

Block 1102 in FIG. 11 represents the payment card/device 102 being interfaced to the POS terminal 106. Block 1104 represents the EMV transaction proceeding, including the payment card/device 102 sending/transmitting a callout list to the POS terminal 106. (It is assumed for present purposes that the POS terminal 106 is embodied as a hotel front desk card reader and related computer terminal.)

Block 1106 in FIG. 11 represents the POS terminal 106 performing one or more callouts as prescribed by the callout list received from the payment card/device 102.

For example, in the case of one callout, the endpoint may be a server/computer system operated by the cardholder's employer. The address for the endpoint may be an IP address, and it may be assumed that the POS terminal 106 is connected to the internet and runs a browser that is able to initiate an interaction with the employer system using the IP address. In some embodiments, the purpose of the callout may be to confirm to the employer that the employee has arrived at the hotel as of a certain date and time.

In another example of a callout that may be executed at 1106, the endpoint may be a server/computer system that hosts a widely used social media website. The purpose of the callout may be to confirm to the employee's family and friends that the employee has arrived safely at his/her destination.

One or more additional callouts may, in some embodiments, also be made at 1106. For example, the endpoint(s) for these callouts may be computer systems operated by or on behalf of nearby service providers, such as a car rental company and/or a restaurant. The callout may prompt the service provider system/endpoint to contact the employee via his/her mobile device. The purpose of the contact may be, e.g., to confirm service availability and/or delivery details, to offer a seating reservation or take-out meal delivery opportunity, etc.

Block 1108 in FIG. 11 represents completion of the transaction between the payment card/device 102 and the POS terminal 106.

Figure 12:
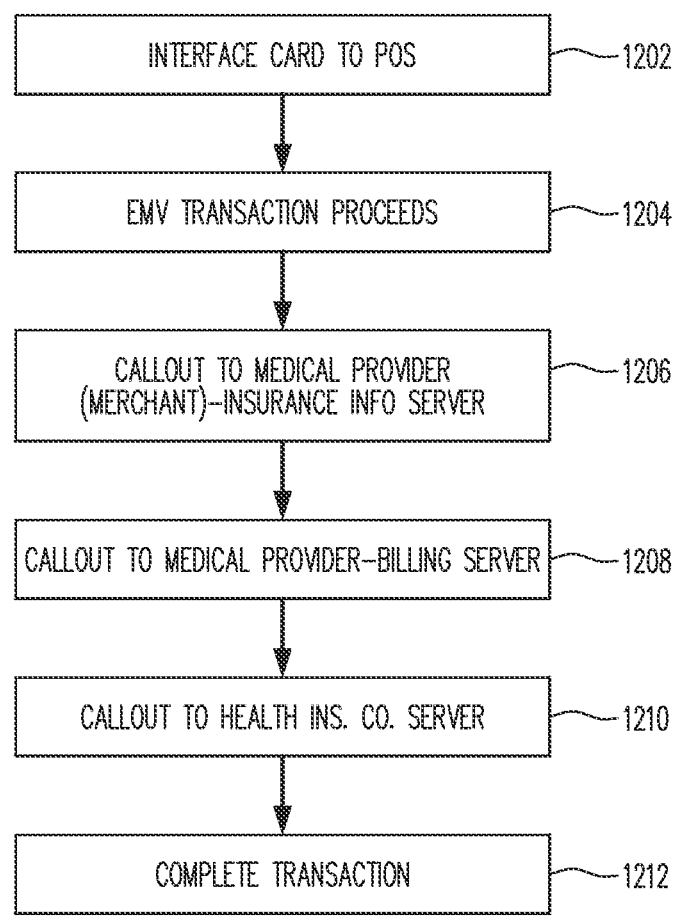

FIG. 12 illustrates a use-case in which callouts are made to more than one type of endpoints during a single transaction. For this use-case it is assumed that the transaction is taking place at a health care provider's facility, and that the payment card/device 102 provides access to a health care payment account.

Block 1202 in FIG. 12 represents the payment card/device 102 being interfaced to the POS terminal 106. At block 1204, the EMV transaction proceeds, and may include the payment card/device 102 providing a callout list to the POS terminal 106.

At block 1206 the POS terminal 106 performs one callout from the callout list. The endpoint for this callout may be a server/computer system operated by or on behalf of the health care provider. It may be assumed that the endpoint for this callout is accessible to the POS terminal 106 via a LAN/WAN connection. The purpose of the callout may be to request from the endpoint a list of health insurers that the health care provider supports, and to return that list to the payment card/device 102. In response to receiving the list of health insurers, the payment card/device 102 may verify that the carrier that provides health insurance to the cardholder is included in the list of health insurers supported by the health care provider.

At block 1208, the POS terminal 106 may perform another callout. In this case, the endpoint may be the health care provider's billing computer system. Again, it may be assumed that this endpoint is also accessible to the POS terminal 106 via a LAN/WAN connection. The purpose of this callout may be to request complete line item details for the services and/or other items billable in connection with the cardholder's current visit to the health care provider.

At block 1210, the POS terminal 106 may perform yet another callout. For this callout, the endpoint may be a server/computer system operated by the cardholder's health insurance carrier. In this case, it may be assumed that the carrier's system is accessible via the internet, via an IP address supplied from the payment card/device 102 to the POS terminal 106. The purpose of this callout may be to alert the health insurance carrier as to the health insurance claim that is being made in connection with the cardholder's visit to the health care provider. In addition or alternatively, the callout may deliver to the carrier's system complete details of the health care provider's bill for the current visit, as required to support the health insurance claim.

Block 1212 indicates completion of the EMV transaction at the POS terminal 106.

With implementation of callouts and prompts as described herein, flexibility may be introduced into otherwise standard payment account transaction processes at the point of sale. In this way, additional security measures may be provided and/or value-added services may be performed and/or useful information may be gathered. The use of callouts and/or prompts may be controlled by data that is personalized into payment devices and accordingly may be controlled by payment account issuers, for their own benefit and/or to benefit account holders, merchants and/or other parties.

In above-described example embodiments and use-cases, the invention has primarily been disclosed within the context of standard EMV transactions. However, the invention is not limited to use with EMV devices, but rather may be applied in connection with any standard protocol for point of sale transactions using payment devices.

In addition to the particular examples and use-cases described above, those who are skilled in the art will recognize that many other types of use-cases and example embodiments are within the contemplation of the present invention.

For example, additional types of callouts may have merchant devices (servers/computer systems, e.g.) as endpoints. In such examples, the merchant may be informed of the cardholder's visit to the merchant's store for the purpose of customer loyalty tracking. In addition or alternatively, the callout may serve to inform the merchant of the item(s) purchased, to aid in inventory tracking and/or stock keeping.

According to other example callouts, the endpoint may be a server/computer system operated by the manufacturer/distributor of an item purchased during the transaction. For example, in the case of luxury goods, callouts of this type may enhance the timeliness of sales tracking information for the owner of the luxury brand.

In some embodiments, the card or other device may serve functions other than or in addition to access to a payment account. For example, the card or device may serve a personal identification function, and one or more callouts may be performed to connect the cardholder's personal identity information with one or more payment accounts that belong to the cardholder. For example, in some embodiments, the card or device may permit access to a governmental social benefits account, and one or more callouts may be performed to aid in preventing improper access to the account and/or for cardholder verification.

As used herein and in the appended claims, the term "payment device" refers to IC payment cards, payment-enabled mobile devices including smartphones, and devices in other form factors that are configured to engage in contactless or contact data communications with POS terminals and/or readers.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

The flow charts and descriptions thereof herein should not be understood to prescribe a fixed order of performing the method steps described therein. Rather the method steps may be performed in any order that is practicable.

As used herein and in the appended claims, the term "payment card system account" includes a credit card account or a deposit account that the account holder may access using a debit card. The terms "payment card system account" and "payment card account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card or a debit card.

As used herein and in the appended claims, the term "payment card system" refers to a system for handling purchase transactions and related transactions. An example of such a system is the one operated by MasterCard International Incorporated, the assignee of the present disclosure. In some embodiments, the term "payment card system" may be limited to systems in which member financial institutions issue payment card accounts to individuals, businesses and/or other organizations.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A payment transaction processing method, comprising:
commencing a first interaction, said first interaction between a payment device and a POS (point of sale) terminal and including a payment transaction process; and
interrupting said first interaction to perform a second interaction, said second interaction between said POS terminal and a device other than the payment device; said second interaction being other than: (a) transmitting an authorization request, and (b) receiving an authorization response;
wherein said second interaction is between the POS terminal and a mobile device that is not the payment device.

2. The method of claim 1, wherein said second interaction is between the POS terminal and a device installed in a motor vehicle.

3. The method of claim 2, wherein said device installed in the motor vehicle provides, to the POS terminal, vehicle identification information that identifies said motor vehicle.

4. The method of claim 1, wherein the payment device is an IC (integrated circuit) payment card.

5. The method of claim 1, wherein:
said first interaction is part of an EMV standard process flow; and
said second interaction is not part of an EMV standard process flow.

* * * * *